INVENTORS
CHARLES GORDON MILBOURNE
JOHN T. PINKSTON, JR.
BY Howson & Howson
ATTYS.

United States Patent Office 3,429,678
Patented Feb. 25, 1969

3,429,678
PROCESS AND APPARATUS FOR MANUFACTURING GAS RICH IN HYDROGEN AND IN OXIDES OF CARBON
Charles Gordon Milbourne, Lansdowne, and John T. Pinkston, Jr., Swarthmore, Pa., assignors to United Engineering & Constructors Inc., Philadelphia, Pa., a corporation of Delaware
Filed Oct. 30, 1964, Ser. No. 407,706
U.S. Cl. 48—196         18 Claims
Int. Cl. C10k 3/00; C10j 1/00

ABSTRACT OF THE DISCLOSURE

A cyclic catalytic process for the reformation of hydrocarbons and steam into a gas rich in hydrogen and oxides of carbon, mainly carbon monoxide, wherein during one part of the cycle hot gaseous combustion products are passed through a zone of reforming catalyst to store heat therein and, in another part of the cycle, a gaseous mixture of hydrocarbons and steam is passed through the catalyst zone in the same direction as said combustion products, wherein the catalyst zone comprises discrete catalyst bodies arranged in a plurality of layers in which the average ratio of unit surface area to unit volume of the catalyst bodies in each layer increases in a defined manner, from layer to layer in the direction of flow of said gaseous materials.

---

Figure 1:
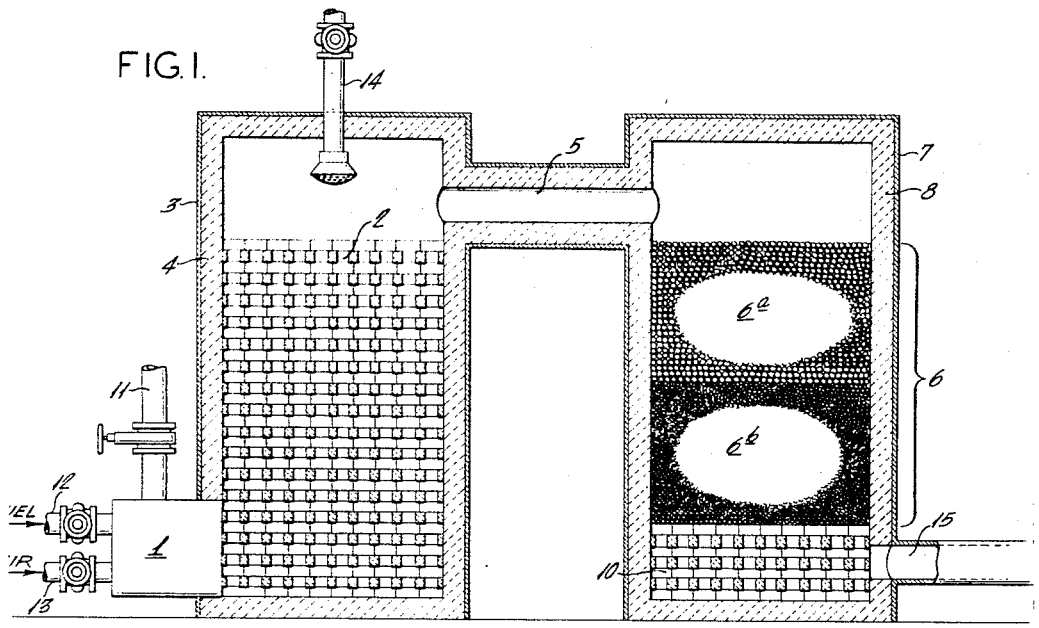

The present invention relates to a novel process for manufacturing a gas rich in hydrogen and oxides of carbon, mainly carbon monoxide; and, more particularly, the present invention relates to a novel cyclic catalytic process for reforming hydrocarbons in the presence of steam into a gas rich in hydrogen and oxides of carbon, mainly carbon monoxide, useful as combustible gas or as a source of gaseous compounds for the synthesis of other materials such as, for example, ammonia and methanol. The invention also relates to novel apparatus in which to carry out the novel process.

The reforming of hydrocarbons in the presence of steam, using a nickel or cobalt catalyst, is well known. This has been accomplished continuously by passing the hydrocarbons and steam through catalyst-containing tubes heated externally. One of the principal limitations of continuous tubular processes is in the heating of the catalyst which is held in the tubes. Special high temperature resistant alloys must be used, and even then there are limitations on the amount of heat that can be supplied through the tube walls to the catalyst bed. This is aggravated when high pressure is employed since extra heavy tubes must be used. Another limitation of continuous tubular processes is that sulfur must be removed by a separate operation from process hydrocarbons which contain sulfur, otherwise the catalyst quickly becomes fouled.

Hydrocarbons and steam have also been reformed in a cyclic manner. In this process, during one part of the cycle, fuel is burned and the hot products of combustion are passed through a relatively massive, stationary bed containing the catalyst to store heat therein, and, in another portion of the cycle, the hydrocarbons to be reformed and steam are passed through the catalyst bed, abstracting heat and becoming reformed into gas rich in hydrogen and oxides of carbon. Such cyclic processes are disclosed in United States Patents 2,665,979, 2,720,450, 2,743,171, 2,759,805, 2,813,012, 2,828,196, 2,868,632 and 2,893,853. Cyclic processes have been conducted commercially at substantially atmospheric pressure.

One problem peculiar to cyclic operation is the temperature fluctuation. Because the gas flow of both heating gases and reacting gases is normally in the same direction through the catalyst zone and because of the alternating storage and abstraction of heat, the catalyst zone is subjected to wide temperature swings (differences in temperatures at different times in the cycle in a given location in the catalyst zone). Such temperature fluctuations not only limit effective utilization of the heat stored but may lead to undesirable carbon deposition on the catalyst bodies.

A solution to this problem is embodied in U.S. Patent No. 2,759,805. However, in some situations, the results obtained by the procedure of this patent could be improved upon, especially where high, superatmospheric pressures are employed.

Operation under high pressure would be advantageous for several reasons. In the first place, when the product gas is to be distributed through municipal gas mains it usually must be compressed or pressurized. In the past, this has been done after the gas has been manufactured. Thus, if the product gas is already under pressure as made, one or more stages of subsequent compression is avoided. This is also true where the product gas is to be treated to reduce or eliminate the quantity of carbon monoxide therein, where high pressure is desirable, and where the gas is to be employed in the synthesis of ammonia or methanol, in which synthesis pressure is required. Moreover, operation under high pressure provides much higher gas-making capacity for the size of the equipment involved.

It has been found that the wide temperature swings, of normal cyclic operation, can be substantially reduced by employing a catalyst zone made up of a plurality of sections or layers which differ as to the size of the catalyst bodies therein in a manner more fully described hereinafter. Catalyst zones utilized in the past in cyclic operation have been composed of substantially uniformly-sized catalyst bodies throughout.

It is the principal object of the present invention to provide a novel cyclic, catalytic process for reforming hydrocarbons and steam into a gas rich in hydrogen and oxides of carbon, mainly carbon monoxide.

It is another object of the present invention to provide an improved cyclic catalytic process for reforming hydrocarbons and steam into a gas rich in hydrogen and carbon oxides, mainly carbon monoxide, whereby temperature swings in the catalyst zone are substantially reduced.

A further object of the present invention is to provide an improved cyclic, catalytic process for reforming hydrocarbons and steam into a gas rich in hydrogen and carbon oxides, mainly carbon monoxide, whereby the heat stored in the catalyst zone during the heating portion of the cycle is more effectively utilized during the reforming portion of the cycle.

Still another object of the present invention is to provide novel apparatus for reforming, cyclically and catalytically, hydrocarbons and steam into a gas rich in hydrogen and oxides of carbon, mainly carbon monoxide.

Other objects will become apparent from a consideration of the following specification and claims.

The process of the present invention comprises, in the cyclic, catalytic reforming of hydrocarbons and steam into a gas rich in hydrogen and oxides of carbon, mainly carbon monoxide, wherein, during one part of the cycle, hot gaseous combustion products are passed through a zone of reforming catalyst to store heat therein and, in another part of the cycle, a gaseous mixture of hydrocarbons and steam is passed through said catalyst zone, in the same direction as said combustion products, for reformation into said gas rich in hydrogen and oxides of carbon, the improvement wherein said gaseous materials are passed through a catalyst zone of discrete catalyst bodies arranged in a plurality of layers in which the average ratio of unit surface area to unit volume of the catalyst bodies in each layer increases from layer to layer in the direction of flow of said gaseous materials, the average ratio of unit surface area in square inches to unit volume in cubic inches of the catalyst bodies in the layer in the entrance portion of said catalyst being between about 3 and about 5 and the average ratio of unit surface area in square inches to unit volume in cubic inches of the catalyst bodies in the layer in the exit portion of said catalyst zone being between about 6 and about 25, and said last-mentioned ratio being at least 50% greater than said first-mentioned ratio.

In accordance with the process of the present invention the catalyst zone will be made up of at least two distinct layers of catalyst bodies differing as aforesaid; and in the preferred embodiment, there will be three such layers. However, it will be understood that any reasonable small number of layers may be used in accordance with the principles described herein.

Figure 2:
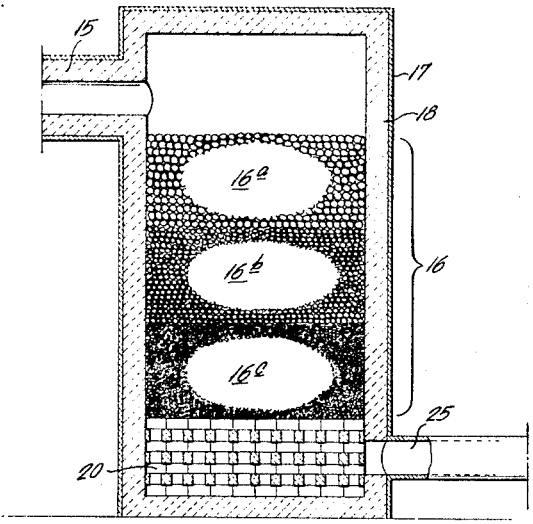

The invention will be more readily understood from a consideration of the drawing in which FIGURE 1, is a side, elevational view, partly in section, of novel apparatus for use in the novel process in which the catalyst zone is composed of two distinct layers of catalyst bodies, and FIGURE 2, is a side, elevational view of apparatus similar to that of FIGURE 1 but in which the catalyst zone is composed of three layers.

Referring to FIGURE 1, a combustion zone, which may be a refractory lined box or tunnel, is represented by numeral 1. Numeral 2 represents a refractory, non-catalytic, heat storage zone and 6 represents the reforming catalyst zone composed of two layers, 6a and 6b, of catalyst bodies. Refractory heat storage zone 2, is contained in a steel shell 3 lined with insulating refractory material 4. The refractory heat storage zone 2 is composed of checkerwork, and, while this may be constructed of conventional checkerbrick, preferred checkerbrick for use is that forming the subject matter of United States Patent 3,037,758. Catalyst zone 6 is also contained in a steel shell 7 lined with insulating refractory material 8. Catalyst zone 6 is a relatively massive, stationary bed of catalyst-containing bodies, described more in detail hereinafter, and may be supported as on checkerwork structure 10. The top of catalyst zone 6 is connected with the exit end of refractory, heat storage zone 2 by means of insulated gasway 5. Connected to combustion zone 1 are valved conduits 11, 12 and 13 for introducing steam, fuel and air, respectively. Although not shown in the drawing, a portion of the steam may by-pass combustion zone 1 and be fed directly into the entrance portion (bottom as shown in the drawing) of refractory, heat storage zone 2. Hydrocarbons for reformation are admitted substantially between the exit portion of the refractory zone 2 and the entrance portion of catalyst zone 6, as by valved conduit 14. As shown in the drawing it is desirable hat the hydrocarbons to be reformed be injected substantially countercurrent to the steam stream, to ensure thorough mixing of the hydrocarbons and steam. Gases leaving catalyst zone 6 pass through conduit 15 for further handling.

Catalyst zone 6, as shown in FIGURE 1, is made up of two layers of catalyst bodies, 6a being the layer in the entrance or inlet portion of the catalyst zone and 6b being the layer in the exit or outlet portion of the catalyst zone. Although FIGURE 1 illustrates each of layers 6a and 6b making up about half of the depth of the catalyst zone, this is not critical, and each layer may make up from about 25 to about 75% of the depth of the catalyst zone. It will be noted that the catalyst bodies in layer 6a are relatively larger in size than those in layer 6b. Thus the average ratio of unit surface area to unit volume of the catalyst bodies in layer 6b is greater than the same ratio for the catalyst bodies in layer 6a. When the catalyst bodies are substantially spherical in shape the average diameter of the catalyst bodies in layer 6a will be between about 1¼ and about 2 inches, preferably about 1½ inches. This provides a ratio $(S/V)$ of unit surface area S in square inches to unit volume V in cubic inches of between about 5 (for a 1¼ inch sphere) and about 3 (for a 2 inch sphere), preferably about 4 (for a 1½ inch sphere). Likewise, when the catalyst bodies are substantially spherical in shape and only two layers of catalyst bodies make up the catalyst zone, the average diameters of the catalyst bodies in layer 6b will be between about ¼ inch and about 1 inch, preferably about ½ inch. This provides a $S/V$ ratio of between about 25 (for a ¼ inch sphere) and about 6 (for a 1 inch sphere), preferably about 12 (for a ½ inch sphere).

In addition, the $S/V$ ratio of the catalyst bodies in layer 6b should be at least about 50% greater than that of the catalyst bodies in the next preceding layer, namely layer 6a in FIGURE 1.

In FIGURE 2 is shown only the catalyst chamber portion of the apparatus since the upstream portion of the apparatus may be same as that shown in FIGURE 1. In FIGURE 2, 15 represents the insulated gasway (corresponding to gasway 5 in FIGURE 1) connecting the top of catalyst zone 16 with the exit of the refractory, non-catalytic, heat storage zone of the upstream portion of the apparatus. Catalyst zone 6 is contained in a steel shell 17 lined with insulating refractory material 18, and may be supported as on checkerwork structure 20. Gases leaving catalyst zone 16 pass through conduit 25 for further handling.

Catalyst zone 16 is made up of three layers, layer 16a, in the inlet portion, layer 16c in the outlet portion and intermediate layer 16b. Although FIGURE 2 illustrates the three layers being of substantially the same depth, this is not necessary, and each layer may make up from about 25 to about 45% of the total catalyst zone depth. The relative sizes of the catalyst bodies in layers 16a, 16b and 16c, respectively, decrease so that the $S/V$ ratio of each layer increases from layer to layer in the direction of gas flow which is downward through catalyst zone 16. When the catalyst bodies are substantially spherical in shape, the average diameters of the catalyst bodies in layer 16a will be between about 1¼ and about 2 inches, preferably about 1½ inch; the average diameters of the catalyst bodies in layer 16b will be between about ¾ and about 1¼ inches, preferably about 1 inch, and the average diameters of the catalyst bodies in layer 16c will be between about ¼ and about ¾ inch, preferably about ½ inch. Thus, the $S/V$ ratio for the various layers will be: for layer 16a, between about 5 and about 3, preferably about 4; for layer 16b, between about 8 and about 5, preferably about 6; and for layer 16c, between about 25 and about 8, preferably about 12.

In addition, the $S/V$ ratio of each layer should be at least about 50% greater than that of the next preceding layer in the direction of gas flow. That is to say, the $S/V$ ratio of layer 16c will be at least 50% greater than that of layer 16b, and the $S/V$ ratio of layer 16b will be at least 50% greater than that of layer 16a.

Although FIGURES 1 and 2 illustrate the catalyst bodies as being substantially spherical in shape, this is not necessary, and catalyst bodies in the shape of cubes, cylinders, rings, and the like may be used. In any case, and regardless of the shape, the $S/V$ ratios as described above will control.

The process is, as stated, cyclic and comprises a heat storage portion and a reforming portion. During the heat storage portion of the cycle, fuel is burned and the resulting hot gaseous products of combustion are passed through the catalyst zone to store heat therein. This may be accomplished, according to the illustration shown in the drawing, by admitting fuel and air through valved conduits 12 and 13, respectively, and burning the fuel in combustion zone 1. The resulting hot products of combustion pass through heat storage, refractory zone 2, through gasway 5, thence through catalyst zone 6 and out through conduit 15. When sufficient heat has been stored in the apparatus including catalyst zone 6, the next main step of the process, namely the reforming portion of the cycle, is commenced by discontinuing, or at least greatly reducing, combustion in combustion zone 1, and admitting steam for the reforming reaction, as through valved conduit 11. The steam becomes preheated in passing through heat storage zone 2 and hydrocarbons to be reformed are injected into the steam stream, as through conduit 14. The resulting hot gaseous mixture of hydrocarbons and steam passes through gasway 5 and down through catalyst zone 6 wherein the endothermic reforming catalytic reaction between the hydrocarbons and steam takes place. The resulting product gas leaves the illustrated apparatus as through conduit 15. This reforming portion of the cycle is discontinued when the temperatures in catalyst zone 6 have fallen to where addition-heat storage is required, and the cycle is repeated.

The same procedure is carried out in the apparatus illustrated in FIGURE 2.

As is well known, there are, in addition to the two principal steps described above, purging steps during which gases remaining in the apparatus after the heat storage and reforming portions of the cycle are pushed out by admitting steam. In addition, it is preferred to pass air through the apparatus after the heat storage portion of the cycle (either before or after the steam purge) to burn off any carbon and sulfur that may have been deposited on the catalyst bodies and to oxidize the catalyst metal in accordance with the metal-oxidation, metal-reduction and gas-oxidizing procedure of U.S. Pat. No. 2,759,805. Admission of steam and/or air for purging also serves to reduce temperatures in the combustion zone which might otherwise become unduly high.

In addition, while the drawing shows the refractory, heat storage zone and the catalyst zone to be in separate shells, it will be apparent that these may be contained in a large single shell provided with space and means, such as a bosh, between the zones to ensure intimate mixing of the hydrocarbon with the steam. Further, while the drawing shows gas flow upwardly through the heat storage zone and downwardly through the catalyst zone, this is not essential, and gas flow could be downward through the heat storage zone and upward through the catalyst zone. Downward flow through the catalyst zone may have the advantage of minimizing agitation of the catalyst bodies.

The present invention provides important improvements over prior cyclic, catalytic process. Thus, temperature swings in the catalyst zone from the beginning to the end of the reforming portion of the cycle have been found to be significantly reduced. And this results in a substantial reduction in carbon formation and carbon deposition on the catalyst bodies. This might be explained on a theoretical basis by considering that only the outer $\frac{1}{32}$–$\frac{1}{16}$" layer of each catalyst body is effective catalytically (see United States Patent 2,828,196) regardless of the size of the catalyst bodies, and that the bulk of the reforming reaction (and hence the abstraction of heat from the catalyst) takes place in the inlet portion of the catalyst zone. Hence, by providing greater volume of catalyst mass relative to effective surface area in the inlet portion of the catalyst zone, the catalyst mass in that location acts as a greater "heat sink" than heretofore with a greater reserve of stored heat. However, uncontrolled enlargement of the catalyst bodies in the inlet portion of the catalyst zone does not satisfactorily solve the problem; if the bodies are too large the heat stored therein is not effectively utilized. Likewise, simply increasing the volume of catalyst relative to surface throughout the catalyst zone would not solve the problem. During the reforming portion of the cycle, the gases passing through the remainder of the catalyst zone are less concentrated with respect to reactants and, therefore, require more effective catalyst surface and less reserve stored heat. Regardless of the explanation, markedly reduced temperature swings have been obtained according to the present invention, with more effective utilization of the heat stored each cycle and, importantly, with markedly reduced carbon formation and carbon deposition on the catalyst bodies. This is particularly important when operating under high, superatmospheric pressure which aggravates the temperature fluctuation and carbon deposition problems of cyclic operation.

The use of catalyst zones having layers of differently sized catalyst bodies has been suggested in United States Patents 2,006,078 and 2,283,499. However, these patents are remote from the present development: for example, they are directed to continuous operation where the above-discussed temperature problems of cyclic operation are not encountered; they are dealing with very fine catalyst particles which give rise to separate problems, like channeling and high pressure drop; they do not disclose reforming hydrocarbons and steam into hydrogen and oxides of carbon, and so on.

The process and apparatus of the present invention may be used in the process of copending application Ser. No. 400,989, filed by John T. Pinkston, Jr., and Charles Gordon Milbourne. In accordance with the process of said copending application, the disclosure of which is incorporated herein by reference, twin sets (each of the type shown in the drawings of the present application) are used in parallel and connected to a common gas expander. During the process, which is adapted for operation at high, superatmospheric pressure, one set is undergoing heat storage while the other is undergoing reforming so that there is an uninterrupted, continuous and substantially uniform mass flow of gases under pressure to the gas expander.

For optimum gas-making capacity, each cycle will be of short duration, usually not more than about 3 minutes nor less than about 1½ minutes, with the presently preferred cycle being about 2 minutes in duration. Where maximum capacity is not the prime consideration, the cycle may last as long as 4 to 5 minutes. Generally, at least about 65% of the cycle time, preferably between about 75 and about 85% thereof is made up of the heat storage and reforming portions of the cycle, the balance being the purges. In a typical cycle having a duration of 2 minutes, the heat storage portion makes up about 44% of the cycle time, and an air purge following combustion makes up about 6% of the cycle time. In this illustration, the reforming period makes up about 35% of the cycle time and a following steam purge makes up about 10% of the cycle time. A steam purge preceding the reforming period or following the air purge makes up about 5% of the cycle.

During the reforming portion of the cycle, a limited amount of air and fuel can also be admitted to the combustion zone for combustion therein with passage of the resulting combustion products through the unit along with the steam and hydrocarbons and reformed products. This type of operation, which helps to maintain temperature levels and is usable when nitrogen is not objectionable in the product gas, is the subject matter of United States Patent No. 2,813,012, the disclosure of which is incorporated herein by reference.

While the present process may be conducted under substantially atmospheric pressure in accordance with conventional cyclic, catalytic operation, it may also be conducted under superatmospheric pressure. Pressures well above atmospheric (at least about 50 p.s.i.g.) may be employed. In most cases, the pressure will be at least about 75 p.s.i.g., preferably at least 90 p.s.i.g. The maximum pressures employed may depend somewhat upon the characteristics desired in the product gas. For example, for making ammonia synthesis gas or for making a gas extremely rich in hydrogen for chemical synthesis, the pressure may go up to about 900 p.s.i.g. In most cases, however, it will not be necessary to exceed about 250 p.s.i.g., and a pressure within the range of from about 150 to about 225 p.s.i.g. will be found satisfactory for most purposes. Regardless of the pressure selected, such pressure conditions should be maintained substantially constant throughout the system and throughout the cycle.

The present process is catalytic in that it relies upon nickel or cobalt, preferably the former, to catalyze the reaction between the hydrocarbons and the stream. A suitable refractory carrier is employed, upon which the catalyst metal is disposed and throughout which it may be distributed. Difficultly reducible oxides, such as alumina, silica, magnesia, calcium oxide, titanium oxide, chromium oxide, oxides of rare earth metals such as, for example, thoria, ceria, and/or others may be present. Compounds, such as chromates and silicates, for instance zirconium silicate, may be employed. Catalytic bodies in which the catalyst metal is distributed upon refractory bodies having a porosity of between about 15% and about 60%, preferably between about 30% and about 45%, with a concentration of catalyst metal between 1½ and about 25% are satisfactory. Preformed catalyst carrier bodies may be impregnated with a solution of a salt of the catalyst metal followed by calcining, or a paste of carrier material may be made using a solution of a salt of the catalyst metal following which the paste is formed into the desired shape and calcined. Alumina is preferred as a carrier for the catalyst metal.

The process of the present invention involves, as stated, the use of a relatively massive, stationary zone of catalyst material. By "massive" is meant a relatively deep bed of catalyst material, for example, at least about 4 feet in depth and up to about 12 feet in depth. Most often, the depth of the catalyst bed will be from about 5 to about 10 feet. The diameter of the catalyst zone may vary greatly, from about ½ foot up to about 15 feet, with most catalyst zones ranging from about 1 to about 12 feet in diameter. By "stationary" is meant that the catalyst material remains at rest and that the position of each catalytic body is more or less fixed with respect to the others as distinguished from fluidized processes.

The hydrocarbons reformed in the reforming portion of the cycle may comprise normally gaseous hydrocarbon material, such as, for example, methane, ethane, propane, or butane, or heavier, ash-free, hydrocarbon distillates such as kerosene, gasoline and gas oil. It is preferred that the hydrocarbon distillates be substantially ash free; that is, contain less than about 100 parts of ash per million. Corresponding unsaturated hydrocarbons may be present, such as, for example, ethylene, propylene, butylene, and the like. When normally liquid hydrocarbons are employed, they may be converted to the gaseous state prior to or upon introduction to the steam stream. Natural gas, which is primarily methane, and refinery gas streams, are among the hydrocarbon materials that may be employed.

With respect to the fuel employed during the heat storage portion of the cycle, it may be any fluid—that is, gaseous or liquid combustible. Hydrocarbons, such as those mentioned above, and especially natural gas, are particularly satisfactory. Ash free liquid hydrocarbons, such as fuel oil, gas, oil, gasoline, kerosene, tar and the like may be employed if desired. In the event a liquid fuel is employed, conventional spraying or other vaporizing means may be utilized to facilitate combustion.

As stated, the principal reaction involved during the reforming portion of the cycle, is the reaction between the hydrocarbons and steam.

The amount of steam employed may depend somewhat upon the use to be made of the product gas. Thus when the carbon monoxide in the product gas is to be converted to carbon dioxide by the water gas shift reaction which requires steam, additional steam may be tolerated in the product gas and in this case the amount employed may go up to about 5 pound mols of steam per pound atom of carbon in the hydrocarbon reactant. Aside from this, the preferred amount of steam is between about 1.5 and about 2.5 pound mols thereof per pound atom of carbon in the hydrocarbon reactant. Some air may be employed during the reforming portion of the cycle, and, in such case, the proportion of steam to hydrocarbons may be decreased to as low as about .8 pound mol of steam per pound atom of carbon.

As far as air itself is concerned, when this is used during the reforming portion of the cycle it will be in an amount generally less than about 2 pound mols thereof per pound atom of carbon in the hydrocarbon reactant, and in most cases will be less than about one pound mol thereof. The preferred amount of air, when used, will be between about 0.1 and about 0.6 pound mol thereof per pound atom of carbon in the hydrocarbon reactant.

The temperatures provided in the system are, of course, still subject to some swing, as between the end and beginning of the heating period, and to some gradient, as between different locations at the same time. Likewise, as is known to those skilled in the art, the exact temperature employed may be determined in part by the type of product gas desired and the hydrocarbon reactant employed. In general, the temperature of the steam leaving refractory, heat storage zone during the reforming portion of the cycle will be in the range of from about 1600 to about 2200° F. so that the resulting mixture of hydrocarbons and steam entering the catalyst zone will have a temperature in the range of from about 1300 and about 1700° F. The temperature in the catalyst zone itself will normally not go below about 1300° F. The upper limit of the temperature in the catalyst zone may also depend, in part, upon the nature of the catalyst, and some catalysts may stand tempertaures as high as about 2000° F. With other, more conventional, catalysts the upper limit is usually about 1700° F. In general, the preferred average temperatures in the catalyst zone during the cycle will be between about 1450 and about 1600° F. As stated, these are average temperatures, and it will be understood that cyclic swings in temperature may result in a temperature somewhat exceeding this range momentarily and a temperature somewhat below this range momentarily, such as the temperature of the exit portion of the catalyst zone at the completion of the reforming portion of the cycle. A product gas leaving the catalyst zone during the reforming portion of the cycle will normally be at a temperature between about 1250° F. and about 1650° F., although it may be somewhat higher when a high temperature-resistant catalyst is used and higher temperatures are used in the catalyst zone.

The product gas will be rich in hydrogen and oxides of carbon, mainly carbon monoxide. However, the gas may range from one consisting essentially of hydrogen and carbon monoxide, with minor or small amounts of carbon dioxide and a small percentage of unconverted hydrocarbons, and having a calorific value of about 275 B.t.u. per cubic foot, up to a gas containing as much as 50% of hydrocarbons containing from one to four carbon atoms, in addition to the hydrogen and carbon monoxide, which gas has a calorific value as high as about 750 B.t.u. per cubic foot. The product gas may be used as a combustible gas and distributed in municipal gas mains or it may be used as a reactant gas, with or without further treatment, for producing other compounds, such as ammonia, methanol and the like. Or it may be used as a source of hydrogen gas.

The following specific example is given for the purpose of illustration only and is not intended to limit the scope of the invention in any way.

Example

In this example two distinct gas-making runs were carried out in apparatus similar to that shown in the drawings except for catalyst zone. In each run: the catalyst zone is 6.4" in diameter and 5 feet deep; the pressure employed during the cycle was about 150 p.s.i.g., and, for a reforming period of 45 seconds with a cycle 2 minutes long, naphtha at the rate of 0.4 gallons per minute and steam at the rate of 5.0 pounds per minute were charged as the reforming reactions.

In one run, Run A, the catalyst zone was composed of ½" alumina spheres containing 5% of nickel, and in the other run, Run B, the top 23" of catalyst zone (the inlet portion) was composed of 1½" alumina spheres containing 5% of nickel, the bottom 24" (the outlet portion) was composed of ½" alumina spheres containing 5% of nickel, and the intermediate 13" was composed of 1" alumina spheres containing 5% of nickel.

Temperatures were recorded during each run and temperature profiles are set forth in the following table.

TABLE

| Distance Below Top (inlet) of Bed | Temperatures, ° F. | | | |
|---|---|---|---|---|
| | Start of Reforming | | After 40 Seconds of Reforming | |
| | Run A | Run B | Run A | Run B |
| 6" | 1,525 | 1,525 | 1,275 | 1,350 |
| 18" | 1,510 | 1,515 | 1,375 | 1,405 |
| 30" | 1,480 | 1,485 | 1,400 | 1,425 |
| 42" | 1,455 | 1,450 | 1,425 | 1,430 |
| 60" | 1,420 | 1,445 | 1,420 | 1,435 |

During Run A lampblack formation was observed and evidence of carbon deposition on the catalyst bodies during reforming was found during each subsequent heat storage portion of the cycle. There was no evidence of carbon formation in Run B.

Modification is possible in the particular procedural techniques and materials employed and in the amounts thereof without departing from the scope of the invention as set forth in the following claims.

What is claimed is:

1. In the cyclic catalytic reformation of hydrocarbons and steam into a gas rich in hydrogen and oxides of carbon, mainly carbon monoxide, wherein, during one part of the cycle, hot gaseous combustion products are passed through a zone of reforming catalyst to store heat therein and, in another part of the cycle, a gaseous mixture of hydrocarbons and steam is passed through said catalyst zone, in the same direction as said combustion products, for reformation into said gas rich in hydrogen and oxides of carbon, the improvement wherein said gaseous materials are passed through a catalyst zone of discrete catalyst bodies arranged in a plurality of layers in which the average ratio of unit surface area to unit volume of the catalyst bodies in each layer increases from layer to layer in the direction of flow of said gaseous materials, the average ratio of unit surface area in square inches to unit volume in cubic inches of the catalyst bodies in the layer in the entrance portion of said catalyst zone being between about 3 and about 5 and the average ratio of unit surface area in square inches to unit volume in cubic inches of the catalyst bodies in the layer in the exit portion of said catalyst zone being between about 6 and about 25, and said last-mentioned ratio being at least about 50% greater than said first-mentioned ratio.

2. The process of claim 1 wherein said catalyst bodies contain nickel.

3. The process of claim 1 wherein said catalyst bodies are substantially spherical in shape; wherein the average diameter of the catalyst bodies in the layer in the entrance portion of the catalyst zone is between about 1¼ and about 2 inches, and wherein the average diameter of the catalyst bodies in the layer in the exit portion of the catalyst zone is between about ¼ and about 1 inch.

4. The process of claim 1 wherein the catalyst bodies are substantinally spherical in shape and contain nickel; wherein the average diameter of the catalyst bodies in the entrance portion of the catalyst zone is between about 1¼ and about 2 inches; wherein the average diameter of the catalyst bodies in the layer in the exit portion of the catalyst zone is between about ¼ and about 1 inch, and wherein each layer of catalyst bodies makes up between about 25 and about 75% of the depth of the catalyst zone.

5. The process of claim 1 wherein each layer of catalyst bodies makes up between about 25 and about 75% of the depth of the catalyst zone.

6. The process of claim 5 wherein the average ratio of unit surface area in square inches to unit volume in cubic inches of the catalyst bodies in the layer in the entrance portion of the catalyst zone is about 4, and wherein said ratio of the catalyst bodies in the layer in the exit portion of the catalyst zone is about 12.

7. In the cyclic catalytic reformation of hydrocarbons and steam into a gas rich in hydrogen and oxides of carbon, mainly carbon monoxide, wherein, during one part of the cycle, hot gaseous combustion products are passed though a zone of reforming catalyst to store heat therein and, in another part of the cycle, a gaseous mixture of hydrocarbons and steam is passed through said catalyst zone, in the same direction as said combustion products, for reformation into said gas rich in hydrogen and oxides of carbon, the improvement wherein said gaseous materials are passed through a catalyst zone of discrete catalyst bodies arranged in three layers in which the average ratio of unit surface area to unit volume of the catalyst bodies in each layer increases from layer to layer in the direction of flow of said gaseous materials, the average ratio of unit surface area in square inches to unit volume in cubic inches of the catalyst bodies in the layer in the entrance portion of said catalyst zone being between about 3 and about 5, the average ratio of unit surface area in square inches to unit volume in cubic inches of the catalyst bodies in the layer in the exit portion of said catalyst zone being between about 8 and about 25, and the average ratio of unit surface area in square inches to unit volume in cubic inches of the catalyst bodies in the layer in the intermediate portion of said catalyst zone being between about 5 and about 8, and the ratio of each said layer being at least 50% greater than that of the next preceding layer in the direction of gas flow.

8. The process of claim 7 wherein the catalyst bodies contain nickel.

9. The process of claim 7 wherein the catalyst bodies are substantially spherical in shape; wherein the average diameter of the catalyst bodies in the entrance portion of the catalyst zone is between about 1¼ and about 2 inches; wherein the average diameter of the catalyst bodies in the exit portion of the catalyst zone is between about ¼ and ¾ inch, and wherein the average diameter of the catalyst bodies in the layer in the intermediate portion of the catalyst zone is between about ¾ and about 1¼ inches.

10. The process of claim 7 wherein each layer of catalyst bodies makes up between about 25 and about 45% of the depth of the catalyst zone.

11. The process of claim 7 wherein the catalyst bodies are substantially spherical in shape and contain nickel; wherein the average diameter of the catalyst bodies in the entrance portion of the catalyst zone is between about 1¼ and about 2 inches; wherein the average diameter of the catalyst bodies in the exit portion of the catalyst zone is between about ¼ and about ¾ inch; wherein the average diameter of the catalyst bodies in the layer in the intermediate portion of the catalyst zone is between about ¾ and about 1¼ inches, and wherein each layer of catalyst bodies makes up between about 25 and about 45% of the depth of the catalyst zone.

12. The process of claim 7 wherein the average ratio of unit surface area in square inches to unit volume in cubic inches of the catalyst bodies in the layer in the entrance portion of the catalyst zone is about 4; wherein said ratio of the catalyst bodies in the layer in the exit portion of the catalyst zone is about 12, and wherein said ratio in the layer in the intermediate portion of the catalyst zone is about 6.

13. In apparatus for the cyclic, catalyst reformation of hydrocarbons and steam into a gas rich in hydrogen and oxides of carbon mainly carbon monoxide, involving a gas-flow path containing, in sequence, a combustion zone, a refractory, heat-storage zone and a reforming catalyst zone, with means for admitting fuel and air to said combustion zone for combustion therein with the passage of the resulting hot gaseous combustion products successively through said refractory heat storage and said catalyst zone, means for admitting steam and hydrocarbons upstream of said catalyst zone for passage through said catalyst zone and conduit means for removing gases from the outlet end of said catalyst zone, the improvement wherein said catalyst zone from its inlet end to its outlet end is composed essentially of discrete catalyst bodies arranged in a plurality of layers in which the average ratio of unit surface area to unit volume of the catalyst bodies in each layer increases from layer to layer from inlet end to outlet end, the average ratio of unit surface area in square inches to unit volume in cubic inches of the catalyst bodies in the layer in the inlet portion of the catalyst zone being between about 3 and about 5 and the average ratio of unit surface area in square inches to unit volume in cubic inches of the catalyst bodies in the layer in the outlet portion of the catalyst zone being between about 6 and about 25, and said last-mentioned ratio being at least about 50% greater than said first-mentioned ratio.

14. The apparatus of claim 13 wherein each layer of catalyst bodies makes up between about 25 and about 75% of the catalyst zone.

15. The apparatus of claim 13 wherein said catalyst bodies are substantially spherical in shape; wherein the average diameter of the catalyst bodies in the layer in the inlet portion of said catalyst zone is between about 1¼ and about 2 inches, and wherein the average diameter of the catalyst bodies in the layer in the outlet portion of said catalyst zone is between about ¼ and about 1 inch.

16. The apparatus of claim 13 wherein there are three layers of catalyst bodies; wherein the average ratio of unit surface area in square inches to unit volume in cubic inches of the catalyst bodies in the layer in the inlet portion of said catalyst zone is between about 3 and about 5; wherein said ratio of the catalyst bodies in the layer in the outlet portion of said catalyst zone is between about 8 and about 25, and wherein said ratio of the catalyst bodies in the intermediate portion of said catalyst zone is between about 5 and about 8.

17. The apparatus of claim 16 wherein the catalyst bodies are substantially spherical in shape; wherein the average diameter of the catalyst bodies in the inlet portion of said catalyst zone is between about 1¼ and about 2 inches; wherein the average diameter of the catalyst bodies in the outlet portion of said catalyst zone is between about ¼ and about ¾ inch, and wherein the average diameter of the catalyst bodies in the layer in the intermediate portion of said catalyst zone is between about ¾ and about 1¼ inches.

18. The apparatus of claim 17 wherein said catalyst bodies contain nickel, and wherein each layer of catalyst bodies makes up betwen about 25 and about 45% of the depth of the catalyst zone.

References Cited

UNITED STATES PATENTS

| | | |
|---|---|---|
| 1,518,043 | 12/1924 | Audianne et al. _____ 23—288 XR |
| 2,006,078 | 6/1935 | Pyzel _____ 23—288 |
| 2,565,395 | 8/1951 | Scharmann. |
| 3,211,641 | 10/1965 | Halik et al. _____ 23—288 XR |
| 3,298,182 | 1/1967 | Webb _____ 23—288 XR |

MORRIS O. WOLK, *Primary Examiner.*

R. E. SERWIN, *Assistant Examiner.*

U.S. Cl. X.R.

23—288; 48—214, 215, 89

UNITED STATES PATENT OFFICE
CERTIFICATE OF CORRECTION

Patent No. 3,429,678 February 25, 1969

Charles Gordon Milbourne et al.

It is certified that error appears in the above identified patent and that said Letters Patent are hereby corrected as shown below:

In the heading to the printed specification, lines 6 and 7, "United Engineering & Constructors Inc." should read -- United Engineers & Construct Inc. --. Column 1, line 66, after "into" insert -- a --. Column 3, line 60 "hat" should read -- that --. Column 7, line 15, "stream" should read -- steam --. Column 12, line 25, "betwen" should read -- between --.

Signed and sealed this 31st day of March 1970.

(SEAL)
Attest:

Edward M. Fletcher, Jr.
Attesting Officer

WILLIAM E. SCHUYLER, JR.
Commissioner of Patents